United States Patent
Müller et al.

(10) Patent No.: US 7,479,647 B2
(45) Date of Patent: Jan. 20, 2009

(54) APPARATUS FOR READING OUT X-RAY INFORMATION STORED IN STORAGE PHOSPHOR LAYER

(75) Inventors: Roland Müller, Munich (DE); Walter Hofmuth, Munich (DE); Rudolf Loistl, Unterhaching (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 0 days.

(21) Appl. No.: 11/567,042

(22) Filed: Dec. 5, 2006

(65) Prior Publication Data

US 2007/0145312 A1    Jun. 28, 2007

(30) Foreign Application Priority Data

Dec. 28, 2005  (EP)  ................. 05113036

(51) Int. Cl.
*G01T 1/105* (2006.01)
(52) U.S. Cl. .................................... 250/584
(58) Field of Classification Search ............... 250/587, 250/584, 586, 585, 580
See application file for complete search history.

(56) References Cited

U.S. PATENT DOCUMENTS

| 5,025,465 | A | 6/1991 | Bauer et al. |
| 5,260,573 | A | 11/1993 | Tsuchino |
| 6,310,357 | B1 | 10/2001 | Fuchs et al. |
| 7,180,085 | B2 * | 2/2007 | Otokuni ............... 250/584 |
| 2004/0004871 | A1 | 1/2004 | Stahl et al. |

2006/0091336 A1  5/2006  Muller et al.

FOREIGN PATENT DOCUMENTS

DE    196 46 607 C1    2/1998

OTHER PUBLICATIONS

English translation of Abstract for DE 196 46 607 C1.
U.S. Appl. No. 11/552,614, filed on Oct. 25, 2006.
U.S. Appl. No. 11/552,620, filed on Oct. 25, 2006.
European Search Report for EP 05113036.7, filed Dec. 28, 2005.

* cited by examiner

*Primary Examiner*—David P Porta
*Assistant Examiner*—Kiho Kim
(74) *Attorney, Agent, or Firm*—Houston Eliseeva LLP

(57) ABSTRACT

An apparatus (4) for reading out X-ray information stored in a storage phosphor layer (2) includes a support (10) onto which a storage phosphor plate (1) is laid. The storage phosphor plate (1) comprises the storage phosphor layer (2) and a support layer (3) onto which the storage phosphor layer (2) is applied. Furthermore, a controller (12) is provided for processing X-ray information read out from the storage phosphor layer (2). According to the invention, a distance sensor (14, 15) serves to determine a distance of the distance sensor (14, 15) from the storage phosphor plate (1) lying on the support (10), and the controller (12) is designed such that it processes the X-ray information read out from the storage phosphor layer (2) dependently upon the distance determined by means of the distance sensor (14, 15). An unlevelness determined by means of the distance sensor (14, 15) is taken into account by the controller (12) when processing the X-ray information read out. In this way, a good image quality of an X-ray image read out is guaranteed in a technically simple way.

26 Claims, 2 Drawing Sheets

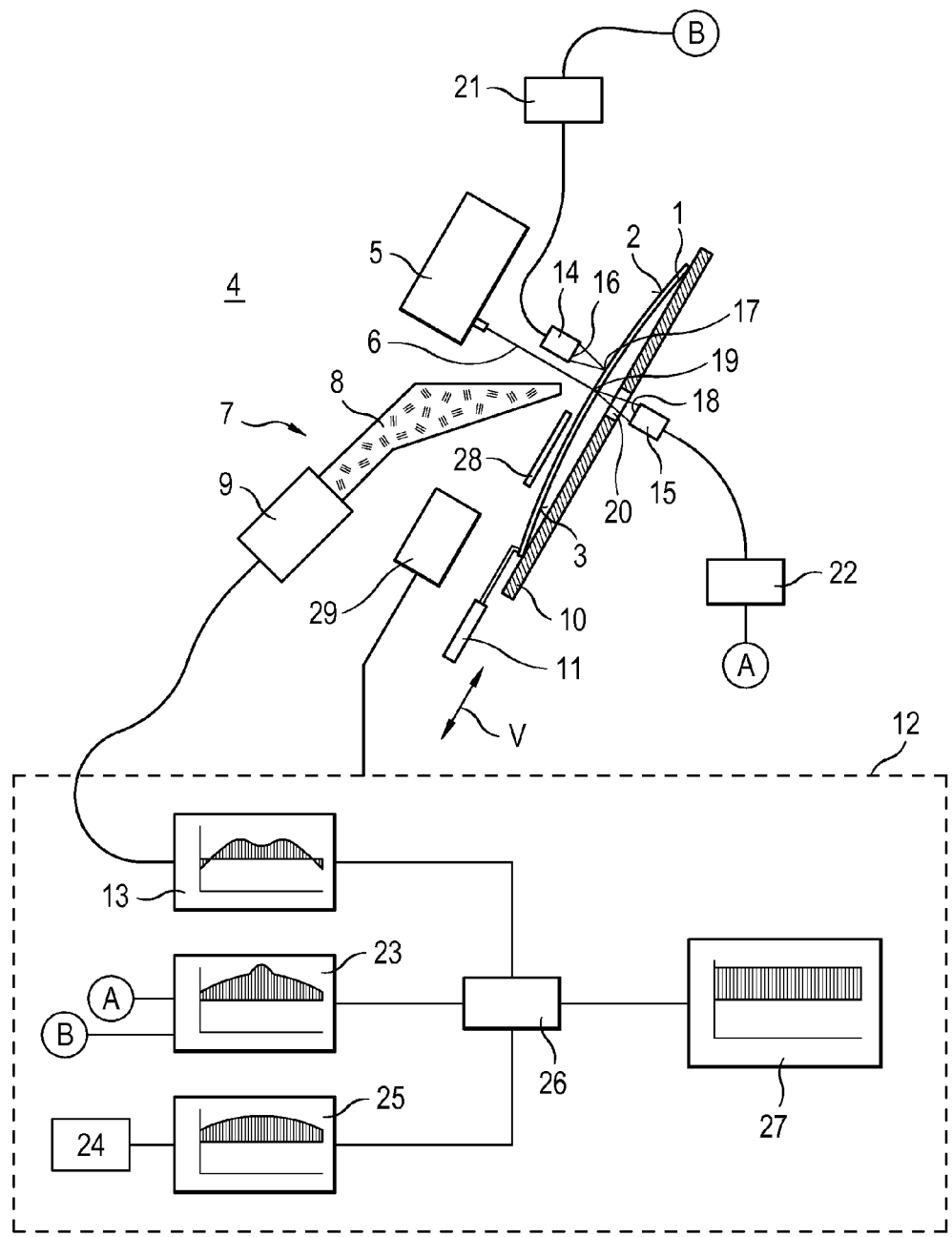

APPARATUS FOR READING OUT X-RAY INFORMATION STORED IN STORAGE PHOSPHOR LAYER

RELATED APPLICATIONS

This application claims priority to European Application No. EP05113036.7, filed on Dec. 28, 2005 which is incorporated herein by reference in its entirety.

BACKGROUND OF THE INVENTION

Apparatuses for reading out X-ray information stored in a storage phosphor layer are used in particular in the field of computer radiography (CR) for medical purposes. An image of an object, for example a patient or a body part of the patient, is produced here by means of X-ray radiation, and this is stored in a storage phosphor layer as a latent image. This type of X-ray image therefore contains X-ray information about the object. In order to read out the X-ray information stored in the storage phosphor layer, the storage phosphor layer is stimulated by means of an irradiation device. As a result of this stimulation, the storage phosphor layer emits light which has an intensity corresponding to the X-ray information stored in the storage phosphor layer. The light emitted from the storage phosphor layer is collected by a detection device and is converted into electric signals, which contain an image of the X-ray information. The electric signals are further processed, and the X-ray information stored in the storage phosphor layer is then made visible. The X-ray information can be shown directly on a monitor, for example, or by means of a printer used specially for X-ray images, on a photographic X-ray film.

The storage phosphor layer is generally applied to a support layer, and these together form a storage phosphor plate. In order to correctly read out the storage phosphor layer, the storage phosphor plate is generally required to have a high degree of levelness. In this way, signal fluctuations in the detected signal, and so image errors, are largely prevented. In order to achieve this levelness, with some variations of read-out apparatuses, the storage phosphor plate is pressed onto a level support or sucked onto the support. It is also possible to attach magnets, both to the storage phosphor plate and to the support, and these guarantee level positioning of the storage phosphor plate. The disadvantage of these variations, however, is that they require a relatively large installation space, are associated with additional weight, and require costly mechanics.

SUMMARY OF THE INVENTION

It is the object of the invention to provide an apparatus for reading out X-ray information stored in a storage phosphor layer with which, in a technically simple way, good image quality of the X-ray image read out can be guaranteed.

According one aspect, the apparatus according to the invention for reading out X-ray information stored in a storage phosphor layer includes a distance sensor for determining a distance of the distance sensor from the storage phosphor plate lying on the support or moved away from the support. Furthermore, the controller for processing the X-ray information read out from the storage phosphor layer is designed such that it processes the X-ray information read out dependently upon the distance determined by means of the distance sensor.

By means of this invention, image errors in the detected image, which can occur due to unlevelness of the storage phosphor plate when it is lying on or is being moved on the support, can largely be avoided. Unlevelness of the storage phosphor plate when it is lying on or is being moved on the support generally corresponds to a curvature of the storage phosphor plate. This curvature, in particular its extension along the length of the storage phosphor plate, can be established by means of the distance sensor. Unlevelness determined in this way is taken into account by the controller when processing electric signals which the X-ray information read out contains. Dependent upon its position, the distance sensor determines in particular the distance between a reference point on the distance sensor and a point on a surface of the storage phosphor plate.

Within the apparatus, the distance sensor is advantageously a fixed, pre-determined distance away from a support plane for the storage phosphor plate formed by the support.

By means of this invention it is possible in an effective and particularly cost-effective way, to achieve a good image quality of the X-ray image read out with a small number of components. A light structure with a small installation space is made possible by the invention. Moreover, the wear and tear of the storage phosphor layer can be kept to a minimum because, e.g., it is not necessary to press or suck the storage phosphor plate onto the support. Furthermore, the invention makes it possible for incidental and high-frequency signal fluctuations caused, e.g., by knocks, to be recognised when reading out the X-ray information and to be equalised during processing. It is possible to guarantee this in "real time".

As a support in the sense of the invention, a level, closed surface area, in particular a continuous support plate, can be used on which the storage phosphor plate lies. Alternatively, as a support in the sense of the invention, several individual support elements can also be used, however, on which the storage phosphor plate lies and/or from which the storage phosphor plate is moved along during the read-out on a detection device. Suitable as support elements are, e.g., individual rollers or pairs of rollers, runners or guide rails which clamp a support plane in which the storage phosphor plate lies or is moved.

In one advantageous embodiment of the invention, the distance sensor is disposed such that the distance of the distance sensor from the support layer of the storage phosphor plate is determined. With this embodiment of the invention, the distance sensor is disposed on the rear side of the storage phosphor plate. The reference point, at which the distance sensor determines the distance, lies on the surface of the support layer. By scanning the support layer, determination of the distance can easily be prevented from possibly stimulating the storage phosphor layer at an inappropriate time because the storage phosphor layer is not required here.

Preferably, the distance sensor is disposed such that the distance of the distance sensor from the storage phosphor layer of the storage phosphor plate can be determined. With this embodiment of the invention, the distance sensor is disposed on the front side of the storage phosphor plate. The reference point at which the distance sensor determines the distance lies on the surface of the storage phosphor layer. In this way, in particular when the storage phosphor layer with the storage phosphor plate lying on top of it is facing away from the support, the distance sensor clearly has free access to the reference point. The distance can thus be determined in a particularly simple way. Independently of the type of distance sensor used, it should be noted here that undesired stimulation of the storage phosphor layer can possibly occur when determining the distance. Advantageously, the apparatus according to the invention can be designed in this case such that this type of stimulation is prevented, or radiation emitted due to stimulation of the storage phosphor layer is detected, and the X-ray information read out is allocated in an appropriate manner.

In a further advantageous embodiment, the support has a hole, and the distance sensor is disposed on the side of the support which is facing away from the storage phosphor plate lying on top of it such that the distance can be determined through the hole. This embodiment is particularly advantageous if the support has a largely closed support area onto which the storage phosphor plate can be laid. In this case, by means of the hole, the distance sensor is offered an easily implementable possibility of scanning the reference point on the storage phosphor plate through the hole so as to determine the distance.

In a particularly preferred embodiment of the invention, the distance sensor is a contact-free, in particular an optical, sensor. In this way one can avoid transmitting force into the storage phosphor plate and keep its wear and tear to a minimum. The distance sensor can particularly advantageously be a laser triangulation sensor. This type of distance sensor gives a particularly accurate result. It is also possible, however, to use a capacitive or inductive sensor, or a sensor which operates with ultrasound.

Preferably, the controller has details on a curvature of the storage phosphor plate. For this, the controller is designed such that it processes the X-ray information read out from the storage phosphor layer dependently upon these details. The details on the curvature can advantageously be contained in a table—a so-called look-up table—which can be implemented particularly easily in the controller. The details on the curvature for the storage phosphor plate, in particular for the special composition of its support layer, were already established before the use of the storage phosphor plate for storing X-ray information, e.g., by means of tests. In particular with a homogeneous curvature of the storage phosphor plate this can be used by the controller in order to process the X-ray information read out. The details on the curvature enable particularly accurate processing of the X-ray information with at the same time low cost when determining the distance.

In a preferred variation of the invention, the controller has details on several different curvatures of the storage phosphor plate. It is designed here such that it selects the details on one of the several different curvatures dependently upon the distance determined, and process the X-ray information read out from the storage phosphor layer dependently upon the details selected. Establishing a single distance at a specific point on one of the surfaces of the storage phosphor plate can therefore suffice in order to determine the overall curvature of the storage phosphor plate.

In a particularly preferred further development of the invention, an identification device for identifying a type of the storage phosphor plate lying on the support is provided. Furthermore, for several different types of storage phosphor plate, the controller has details on one or more curvatures. It is designed such that it selects the details on the curvature dependently upon the storage phosphor plate used and processes the X-ray information read out from the storage phosphor layer dependently upon the details selected. The storage phosphor plate can, for example, have a special identification which can be identified by the identification device. This embodiment of the invention is based upon the knowledge that storage phosphor plates with a different composition, in particular of their support layers, have different curvatures. By establishing the type of storage phosphor plate, precise processing of the X-ray information can be implemented in a particularly simple way.

The apparatus according to the invention includes an irradiation device for irradiating the storage phosphor layer with stimulation radiation. Furthermore, a detection device for collecting emission radiation from the storage phosphor layer as a result of irradiation with the stimulation radiation is provided. The irradiation and detection devices are preferably disposed such that they are directly adjacent to one another when the storage phosphor plate of the storage phosphor layer is lying on the support. In this way the stimulation radiation can be directed particularly accurately onto the storage phosphor layer to be stimulated, and the emission radiation emitted from the storage phosphor layer as a result of the stimulation can be particularly accurately collected.

It is particularly preferable for the distance sensor to be designed such that it determines the distance when the stimulation radiation hits the storage phosphor layer. With this embodiment, it is precisely when the storage phosphor layer is stimulated and emission radiation is emitted that the distance, and so the unlevelness of the storage phosphor plate, is established. This leads to particularly accurate allocation of the X-ray information detected and the distance established. In this way it is possible to produce a particularly good X-ray image when processing the X-ray information.

Advantageously, the distance sensor is disposed such that it determines the distance at a location on the storage phosphor plate which is at a point or at least close to a point at which the stimulation radiation hits the storage phosphor layer. With this embodiment, the distance, and so the unlevelness of the storage phosphor plate, can be established precisely where the storage phosphor layer is stimulated and emission radiation is emitted. This leads to even more accurate allocation of X-ray information detected and a distance established. In this way it is possible to produce an even better X-ray image when processing the X-ray information.

In a particularly advantageous embodiment of the invention, the apparatus includes several distance sensors for determining distances from the storage phosphor plate lying on the support. In this way, the curvature of the storage phosphor plate can be determined very precisely, and this leads to even more improved processing of the X-ray information and to a qualitatively particularly high quality X-ray image.

Preferably, at least one of the several distance sensors is disposed here such that the distance from the support layer of the storage phosphor plate can be determined. Furthermore, at least one other of the several distance sensors is disposed such that the distance from the storage phosphor layer of the storage phosphor plate can be determined. In this way, at least one distance can be determined on the front and also on the rear side of the storage phosphor plate. This leads to particularly accurate determination of a curvature of the storage phosphor plate which can then be taken into account as appropriate when processing the X-ray information.

It is particularly preferred if at least one guide element is provided for supporting the levelness of at least one region of the storage phosphor plate. This type of guide element can be disposed in particular such that it pushes or pulls the storage phosphor plate in the direction of the support in the region of a curvature in order to thus reduce the curvature present during stimulation by means of the stimulation radiation and during emission of emission radiation in the storage phosphor plate. This type of guide element can be realised in particular by means of a brush.

In general according to another aspect, the invention features a method for reading out X-ray information stored in a storage phosphor layer. The method comprises supporting a storage phosphor plate, the storage phosphor plate including a storage phosphor layer and a support layer onto which the storage phosphor layer is applied. The X-ray information read out from the storage phosphor layer is processed and a position of the storage phosphor plate is determined along a direction perpendicular to a plane of the plate. Finally, the X-ray information read out from the storage phosphor layer is processed in response to the determined position.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1 shows an example of a storage phosphor plate;

FIG. 2 shows an example of an embodiment of an apparatus according to the invention for reading out X-ray information stored in a storage phosphor layer.

DETAILED DESCRIPTION OF THE PREFERRED EMBODIMENTS

Figure 3:
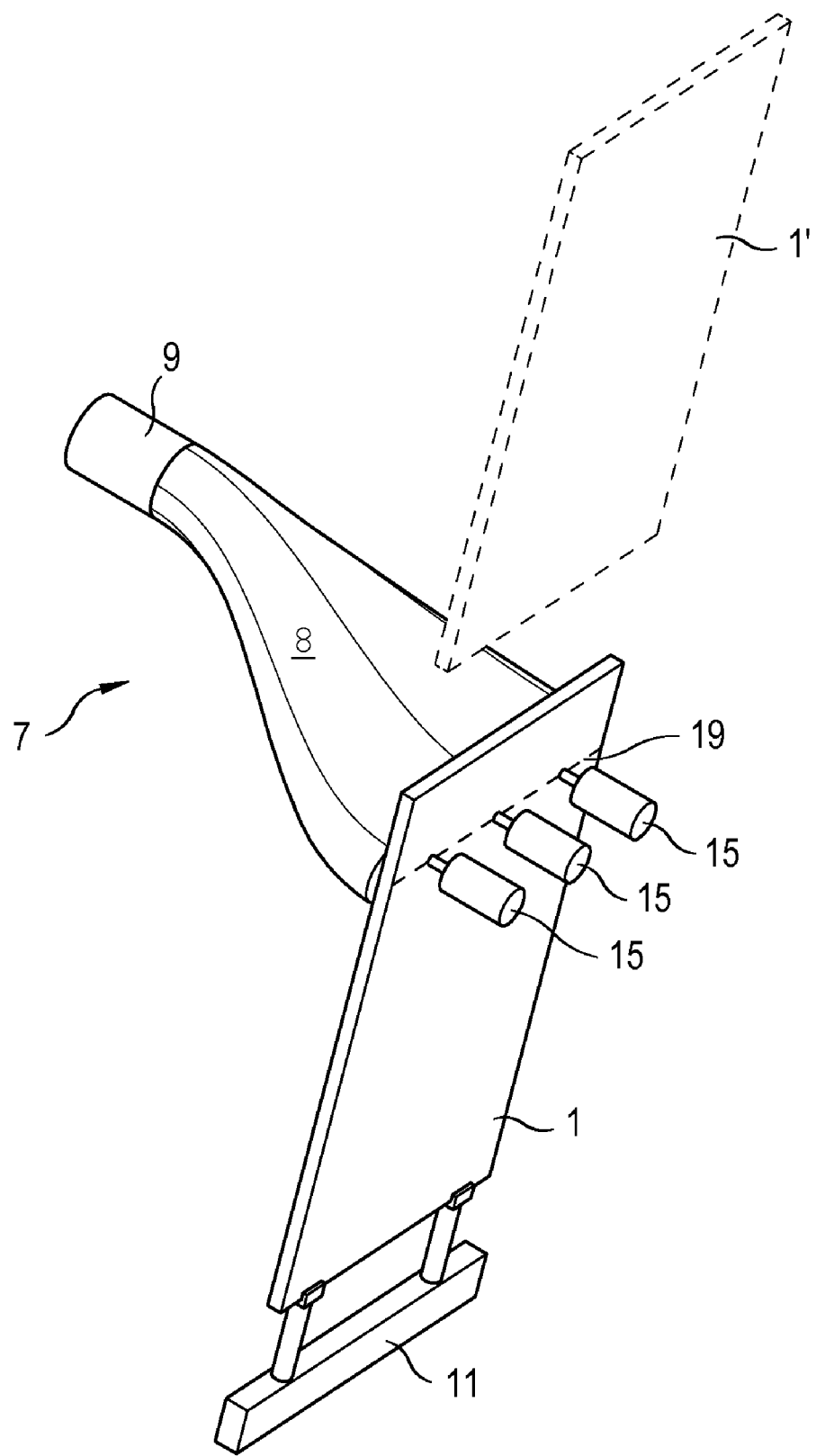
FIG. 3 shows a further example of an embodiment of an apparatus according to the invention.

FIG. 1 shows an example of a storage phosphor plate 1. The storage phosphor plate 1 includes a storage phosphor layer 2 and a support layer 3 onto which the storage phosphor layer 2 is applied. The storage phosphor layer 2 is preferably made up of a plurality of phosphor particles which serve to store X-ray information. The support layer 3 here is a laminate which is advantageously 1-2 millimetres (mm) thick. The laminate includes in particular a layer with synthetic resin which is reinforced with glass fibres or carbon fibres. This type of support layer is relatively rigid so that it exhibits a homogeneous or continuous curvature. Particularly practical support layers have an elasticity modulus of 15-30 MPa. The characteristic of this type of homogeneous curvature can be determined easily by means of a distance measurement.

FIG. 2 shows an example of an embodiment of a read-out apparatus 4 according to an embodiment of the invention for reading out X-ray information stored in the storage phosphor layer 2. This X-ray information was stored in the storage phosphor layer 2 by irradiating it with X-ray radiation. In order to read out the stored X-ray information the read-out apparatus 4 includes an irradiation device 5 which serves to irradiate the storage phosphor layer 2 with stimulation radiation 6. The irradiation device 5 is advantageously designed such that the storage phosphor layer 2 is irradiated with stimulation radiation 6 line by line. A so-called "flying spot" irradiation device is used here as the irradiation device 5 with which a laser beam emitted by a laser is aligned to a rotatably mounted polygon mirror. The polygon mirror rotates so that the laser beam is moved over one line of the storage phosphor layer 2. Individual points of the line are stimulated one after the other. Alternatively, a laser diode line, for example, can also be used as the irradiation device 5 which includes a plurality of laser diodes disposed next to one another. With this laser diode line, one line of the storage phosphor layer 2 is irradiated and stimulated.

As a result of the stimulation of the storage phosphor layer 2 by means of the stimulation radiation 6, the storage phosphor layer 2 emits emission radiation, the intensity of which is dependent upon the X-ray information stored in the storage phosphor layer 2. In order to collect the emitted emission radiation, the read-out apparatus 4 contains a detection device 7. In this example of an embodiment according to FIG. 2, the latter contains a light conductor 8 to which a photomultiplier 9 is attached. The light conductor 8 collects emitted emission radiation and conveys it on to the photomultiplier 9. Alternatively, the detection device 7 can, for example, have a line detector which can include a so-called "charge-coupled device" (CCD) line. The CCD line has a plurality of photodetectors disposed parallel and next to one another in a line. By means of the detection device 7 a photoelectric conversion of the emission radiation received can be implemented. Between the irradiation device 5 and the detection device 7 there is a stable connection so that the display of the X-ray information stored in the storage phosphor layer 2, i.e. the stimulation of the storage phosphor layer and the receipt of the radiation emitted as a result of stimulation, can be precisely matched, and precise allocation is also always guaranteed during the actual read-out process.

Furthermore, the read-out device 4 has a support 10 on which the storage phosphor plate 1 lies for read-out. The support 10 has a support area which provides support points on which the storage phosphor plate 1 is laid. The support 10 is in particular in the form of a table. The storage phosphor plate 1 is securely mounted on the support 10. In this example of an embodiment, both the irradiation device 5 and the detection device 7 are disposed on the same side of the support 10. The storage phosphor plate 1 lies on the support 10 here such that the storage phosphor layer 2 is facing towards the irradiation device 5 and the detection device 7. The support layer 3 lies on the support 10 and is a reflecting support layer. The side of the support 10 on which the storage phosphor plate 1 lies is called here the front side and the side which is facing away from the storage phosphor plate 1 lying on it, is called the rear side of the support 10. It is also possible to dispose the irradiation device 5 on the one side of the support 10, and the detection device 7 on the other side of the support 10. In this case, the support layer 3 is in the form of a transparent support layer. In this case, the support 10 is advantageously designed such that it only has support beams at its edges on which the storage phosphor plate 1 lies so that—depending upon the design—either the emission radiation emitted from the storage phosphor layer 2 or the stimulation radiation 6 emitted from the irradiation device 6 can pass, unhindered, through the support 10.

By means of actuator 11, which can for example be a linear motor, the support 10 for reading out the X-ray information stored in the storage phosphor layer 2 is movable in a shift direction V. In this way movement is produced so as to read out the whole storage phosphor layer 2 by means of line by line stimulation and detection. The irradiation device 5 and the detection device 7 are mounted securely in the read-out apparatus 4. Alternatively, the support 10 can be mounted securely in the read-out apparatus. In this case, the irradiation device 5 and the detection device 7 are moved past the storage phosphor plate 1 in the shift direction V by means of the actuator 11.

Furthermore, the read-out apparatus 4 includes controller 12 which is designed to control the read-out of the X-ray information. For this it is connected to different components of the read-out apparatus 4. In particular, the controller 12 is connected to the photomultiplier 9 in order to process the electric signals produced by the photomultiplier 9 which include an image of the X-ray information stored in the storage phosphor layer 2. The photomultiplier 9 includes an analogue to digital converter with which the analogue electric signals obtained by the photoelectric conversion are converted into corresponding digital signals which are then supplied to the controller 2. In FIG. 2 an example of this type of signal supplied by the photomultiplier 9 is shown schematically in a diagram 13.

The storage phosphor plate 1 lying on the support 10 is generally not totally level. This can give rise to faulty signal fluctuations in the detection signal produced by the detection device 7. These signal fluctuations produce undesired image errors in the X-ray image. In order to avoid this, the read-out apparatus 4 has two distance sensors 14 and 15 with which unlevelness, and so a curvature, of the storage phosphor plate 1 can be established. In the example of an embodiment according to FIG. 2 the distance sensor 14 is disposed on the front side of the support 10. The distance sensor 14 measures the distance from a reference point 16 on its lower side and a point 17 on the surface of the storage phosphor layer 2. The point 17 is preferably located directly beneath the reference point 16. The distance sensor 15 is located on the rear side of the support 10. The distance sensor 15 measures a distance from a reference point 18 on its lower side and a point 19 on the surface of the support layer 3. The point 19 is preferably located directly beneath the reference point 18. On the direct connection line between the reference point 18 and the point 19 there is a hole 20 in the support 10 in order to make it possible for the distance sensor 15 to be directly connected to the support layer 3. The distance sensors 14, 15 are in particular mounted securely within the read-out apparatus 4. They are controlled by the controller 12 so that at pre-specified, regular intervals of time they establish the respective distance from the storage phosphor plate 1 lying on the support 10 and moved past the distance sensors 14, 15. In this way a plurality of distances are determined which give an image of the curvature of the storage phosphor plate 1. The distances established are conveyed to the controller 12 by analogue to digital converters 21 and 22 allocated to the distance sensors 14 and 15. In FIG. 2, for illustration reasons, the connection between the analogue to digital converter 22 and the controller 12 is shown by means of a connection place holder A and the connection between the analogue to digital converter 21 and the controller 12 is shown by means of a connection place holder B.

In FIG. 2, an example of a signal supplied by the distance sensors 14 and 15 with distances is shown schematically in a diagram 23. Diagram 23 shows a curvature of the storage phosphor plate 1. It is possible here to combine, in an appropriate manner, the distance details supplied separately by the two distance sensors 14, 15 in the controller 12. If appropriate, a plausibility control can also be undertaken. Because the distance sensor 15 is disposed on the rear side of the support 10, the thickness of the storage phosphor plate 1 is to be taken into account when processing the distances supplied by the distance sensor 15. The distances measured by the distance sensors 14, 15 correspond to distance fluctuations of the surface of the storage phosphor layer 2 from the detection unit 7, in particular from its light conductor 8 which absorbs the emission radiation emitted by the storage phosphor layer 2. These distance fluctuations are used by the controller 12 when processing the signals supplied by the photomultiplier 9 with read out X-ray information. An equalisation calculation takes place in the controller 12.

The distance sensors 14, 15 are disposed here directly next to the stimulation point determined by the irradiation device 5 and to the detection point determined by the detection device 7. The distance sensor 15 is disposed here such that it determines the distance at the point of the support layer 3 which is located directly beneath the point of the storage phosphor layer 2 where the stimulation radiation 6 hits the storage phosphor layer 2. The distance sensor 14 is disposed opposite the distance sensor 15 in the shift direction V, offset to the side. Advantageously the distance sensor 14—observed in shift direction V—is placed behind the stimulation and detection point so that any possible stimulation of the storage phosphor layer 2 by the distance sensor 14 does not have any effect upon the X-ray information read out by the detection device 7. In this example of an embodiment, determining the distances by means of the distance sensors 14, 15 takes place during read-out of the X-ray information. In this way it is guaranteed that both the read-out and determining the distances is undertaken together when the storage phosphor plate 1 is passed through the read-out device 4. Furthermore, the distances determined are in fact those which are present when the X-ray information is read out.

Contact-free sensors such as, e.g., optical sensors, can be used in particular as distance sensors 14, 15. Laser triangulation sensors are particularly suitable. However, capacitive or inductive sensors or sensors based on ultrasound are also possible. In general, sampling can also take place by means of contact, for example upon the basis of potentiometric principles. The components used here are to be suitably calibrated due to the effect of force transmission upon the measurement result.

In addition to the two distance sensors 14, 15, further sensors can also be provided for determining distances from the storage phosphor plate 1. If so required, this improves even more the processing of the X-ray information by the controller 12. However, it is also possible to use just one instead of two distance sensors. Fewer components are then needed for the structure of the read-out apparatus 4, and also the X-ray information is processed in a simpler way in the controller 12. A single distance sensor is sufficient particularly when a storage phosphor plate 1 with a particularly rigid support layer 3 is used, the curvature behaviour of which is known and is almost regularly even. In this case it is sufficient, under certain circumstances, to determine the distance just a single time, for example in the middle of the storage phosphor plate 1 because in this way the overall curvature is known.

The controller 12 includes a storage unit 24 in which several curvatures for the storage phosphor plate 1 are stored as so-called look-up tables. The characteristics of the curvatures are advantageously determined by preliminary tests and give typical, in particular homogeneous curvatures of the storage phosphor plate 1. The curvatures stored in the look-up tables therefore correspond in particular to experienced values of the curvature behaviour of the storage phosphor plate 1. Dependent upon different factors, such as, e.g., the position of the storage phosphor plate 1 in the read-out apparatus 4, the level of use of the storage phosphor plate 1 etc., the curvature behaviour of the storage phosphor plate 1 can be different. By determining a distance by means of one or both distance sensors 14, 15 the relevant curvature can be concluded dependent upon this distance. The appropriate look-up table corresponding to this relevant curvature is therefore read out from the storage unit 24 by the controller 12. In FIG. 2 this type of curvature is shown in a diagram 25. Instead of the several curvatures stored in the storage unit 24 for the storage phosphor plate 1, it can also suffice to provide just a single curvature for the storage phosphor plate 1 in a look-up table.

The controller 12 is designed such that it takes into account the selected curvature when processing the X-ray information read out. The controller includes a digital signal processor 26 to which data relating to the selected curvature (diagram 25), the distances established by the distance sensors 14, 15 (diagram 23) and the data relating to the X-ray information emitted (diagram 13) are supplied. From these details the signal process 26 establishes the X-ray information actually stored in the storage phosphor layer 2. In FIG. 2 these are shown schematically in a diagram 27. The example of an embodiment shown in diagrams 13, 23, 25 and 27 corresponds to a grey exposure of the storage phosphor layer 2 with jolting.

In order to support the levelness of the storage phosphor plate 1, at least one guide element 28 is provided in the read-out apparatus 4. The guide element 28 can advantageously be a brush. The guide element 28 guarantees here that the storage phosphor plate 1 does not exceed a maximum curvature pre-determined by the guide element 28. The guide element 28 limits the bending of the storage phosphor plate 1. The effect of the guide element 28 can be limited to one or more regions of the storage phosphor plate 1. In particular, it can deploy its effect in the region of stimulation and read-out of the storage phosphor layer 2. The guide element supports the levelness of the storage phosphor plate 1 in particular in order to exclude signal fluctuations during read-out, e.g., caused by external vibrations, and/or to increase the mechanical reliability.

The read-out apparatus 4 further includes identification device 29 for identifying the type of the storage phosphor plate 1 located on the support 10. For this, a corresponding identification, e.g., a mark, can be provided on the storage phosphor layer 1 which the identification device 20 reads. The identification device 29 is connected to the controller 12 in order to communicate the type of storage phosphor plate 1 to the latter. The controller is designed such that look-up tables for different types of storage phosphor plate are stored in the storage unit 24. Depending upon the identified type, the controller 12 selects one of the stored look-up tables in order to use it when processing the X-ray information. The type of storage phosphor plate 1 used, and in particular its support layer 3, can furthermore also be used to control the distance sensors. For example, the frequency of determining the distance can depend upon the rigidity of the support layer 3 used. The more homogeneous and stable (rigid) the structure of the storage phosphor plate 1, the more the current determination of distances can be dispensed with because a largely appropriate curvature and experienced values are provided in the look-up tables in the storage unit 24 for processing and correcting the X-ray information read out.

FIG. 3 shows a further example of an embodiment of an apparatus 4 according to the invention. In this example, the storage phosphor plate 1 or 1' is conveyed past the detection device 7, which comprises a light conductor 8 and a photomultiplier 9 by a drive mechanism 11 in shift direction V. In the example shown, the storage phosphor plate 1 is guided by guide rails (not shown) extending to the side, parallel to the shift direction V or by rollers (not shown) disposed along the shift direction V.

Due to the self-supporting guidance of the storage phosphor plate 1, the latter does not generally have the levelness required for an accurate read-out. In particular, the storage phosphor plate 1 can easily be deformed as a result of the force of gravity or internal tensions in the material of the support layer. In order to record the deviation of the storage phosphor plate 1 from an ideal plane and the extent of its deformation, in the example shown, three distance sensors 15 are provided which record the distance of the respective distance sensor 15 from the support layer of the storage phosphor plate 1 in the region of the scan line 19. This scan line 19 shows the point at which the stimulation radiation hits the storage phosphor layer. Processing of the signals of the distance sensors 15 and the corresponding correction of the signal of the photomultiplier 9 happens similarly to the example of an embodiment described in FIG. 2.

List of reference numbers: 1 storage phosphor plate, 2 storage phosphor layer, 3 support layer, 4 read-out apparatus, 5 irradiation device, 6 stimulation radiation, 7 detection device, 8 light conductor, 9 photomultiplier, 10 support, 11 actuator, 12 controller, 13 diagram, 14 distance sensor, 15 distance sensor, 16 reference point, 17 point on the surface of the storage phosphor layer, 18 reference point, 19 point on the surface of the support layer, 20 hole, 21 analogue to digital converter, 22 analogue to digital converter, 23 diagram, 24 storage unit, 25 diagram, 26 signal processor, 27 diagram, 28 guide element, 29 identification device, A connection place holder, B connection place holder, and V shift direction.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for reading out X-ray information stored in a storage phosphor layer, comprising:
   a support onto which a storage phosphor plate is laid or on which the storage phosphor plate is guided, the storage phosphor plate including a storage phosphor layer and a support layer onto which the storage phosphor layer is applied;
   an irradiation device that irradiates the storage phosphor layer with stimulation radiation to stimulate the storage phosphor layer to produce emission radiation;
   a detection device for reading out the X-ray image information stored in the storage phosphor layer by collecting the emission radiation which the storage phosphor layer emits as a result of the stimulation radiation;
   controller for processing X-ray image information read out from the storage phosphor layer by the detection device;
   a distance sensor for determining a distance of the distance sensor from the storage phosphor plate lying or guided on the support;
   the controller processing the X-ray image information read out from the storage phosphor layer by the detection device in response to the distance determined by the distance sensor.

2. The apparatus according to claim 1, wherein the distance sensor is disposed such that the distance of the distance sensor from the support layer of the storage phosphor plate is determined.

3. The apparatus according to claim 1, wherein the distance sensor is disposed such that the distance of the distance sensor from the storage phosphor layer of the storage phosphor plate is determined.

4. The apparatus according to claim 1, wherein the support has a hole and the distance sensor is disposed on the side of the support which is facing away from the storage phosphor plate such that the distance is determined through the hole.

5. The apparatus according to claim 1, wherein the distance sensor is a contact-free optical sensor.

6. The apparatus according to claim 1, wherein the controller stores information characterizing a curvature of the storage phosphor plate and processes the X-ray image information read out from the storage phosphor layer in response to the curvature information.

7. The apparatus according to claim 6, wherein the controller stores information characterizing several different curvatures of the storage phosphor plate and selects one of the several different curvatures depending upon the determined distance and processes the X-ray image information read out from the storage phosphor layer depending upon the selected curvature.

8. The apparatus according to claim 6, further comprising an identification device that determines a type of the storage phosphor plate on the support, and the controller, for several different types of storage phosphor plate, stores one or more curvatures, and processes the X-ray image information read out from the storage phosphor layer in response to the one or more stored curvatures of the identified type of storage phosphor plate.

9. The apparatus according to claim 1, wherein the distance sensor determines the distance when the stimulation radiation hits the storage phosphor layer.

10. The apparatus according to claim 9, wherein distance sensor is disposed to determine the distance at a location on the storage phosphor plate which is at or near a point at which the stimulation radiation hits the storage phosphor layer.

11. The apparatus according to claim 1, further comprising several of the distance sensors.

12. The apparatus according to claim 11, wherein one of the several distance sensors is disposed such that the distance from the support layer of the storage phosphor layer is determined, and at least one other of the several distance sensors is disposed such that the distance from the storage phosphor layer of the storage phosphor plate is determined.

13. The apparatus according to claim 1, further comprising at least one guide element for supporting the levelness of at least one region of the storage phosphor plate.

14. The apparatus according to claim 1,
wherein the distance of the distance sensor from the detection device remains substantially constant when the distance of the distance sensor from the storage phosphor plate changes.

15. The apparatus according to claim 1,
wherein the controller processes the X-ray image information read out from the storage phosphor layer by the detection device dependently upon the distance determined by the distance sensor to substantially eliminate effects in the X-ray image information due to distance fluctuations of the surface of the storage phosphor layer from the detection device.

16. The apparatus according to claim 1, wherein the controller changes a grey exposure level of the X-ray image information in response to the distance determined by the distance sensor.

17. The apparatus according to claim 1, wherein the controller corrects for signal fluctuations in a detection signal from the detection device to correct an X-ray image represented by the X-ray image information in response to the distance determined by the distance sensor.

18. A method for reading out X-ray image information stored in a storage phosphor layer, comprising:
supporting a storage phosphor plate, the storage phosphor plate including a storage phosphor layer and a support layer onto which the storage phosphor layer is applied;
irradiating the storage phosphor layer with stimulation radiation to stimulate the storage phosphor layer to produce emission radiation;
reading out the X-ray image information stored in the storage phosphor layer by collecting the emission radiation which the storage phosphor layer emits as a result of the stimulation radiation;
processing the X-ray image information read out from the storage phosphor layer by the detection device;
determining a position of the storage phosphor plate along a direction perpendicular to a plane of the plate; and
processing the X-ray image information read out from the storage phosphor layer in response to the determined position.

19. The method according to claim 18, further comprising:
characterizing a curvature of the storage phosphor plate; and
processing the X-ray image information read out from the storage phosphor layer in response to the curvature information.

20. The method according to claim 19, further comprising:
storing information characterizing several different curvatures of the storage phosphor plate;
selecting one of the several different curvatures depending upon the determined position; and
processing the X-ray image information read out from the storage phosphor layer depending upon the selected curvature.

21. The method according to claim 18, further comprising:
determining a type of the storage phosphor plate;
storing, for several different types of storage phosphor plate, one or more curvatures, and
processing the X-ray image information read out from the storage phosphor layer in response to the one or more stored curvatures of the identified type of storage phosphor plate.

22. The method according to claim 16, further comprising guiding the storage phosphor plate to improve a levelness of at least one region of the storage phosphor plate.

23. The method according to claim 18, wherein the distance of the distance sensor from a detection device for reading out the X-ray image information stored in the storage phosphor layer by collecting emission radiation emitted by the storage phosphor layer remains substantially constant when the distance of the distance sensor from the storage phosphor plate changes.

24. The method according to claim 18, further comprising substantially eliminating effects in the X-ray image information due to distance fluctuations of the surface of the storage phosphor layer from the detection device by processing the X-ray image information read out from the storage phosphor layer dependently upon the determined position of the storage phosphor plate along a direction perpendicular to a plane of the plate.

25. The method according to claim 18, further comprising changing a grey exposure level of the X-ray image information in response to the determined position.

26. The method according to claim 18, further comprising correcting for signal fluctuations in a detection signal to correct an X-ray image represented by the X-ray image information in response to the determined position.

* * * * *

UNITED STATES PATENT AND TRADEMARK OFFICE
CERTIFICATE OF CORRECTION

| | | |
|---|---|---|
| PATENT NO. | : 7,479,647 B2 | Page 1 of 1 |
| APPLICATION NO. | : 11/567042 | |
| DATED | : January 20, 2009 | |
| INVENTOR(S) | : Roland Müller et al. | |

It is certified that error appears in the above-identified patent and that said Letters Patent is hereby corrected as shown below:

In column 12, Claim 22, line 37, change "16" to --18--.

Signed and Sealed this

Seventeenth Day of March, 2009

JOHN DOLL
*Acting Director of the United States Patent and Trademark Office*